May 23, 1933.   W. J. HAAG   1,911,022
CHANGE SPEED MECHANISM
Filed April 25, 1932   2 Sheets-Sheet 1
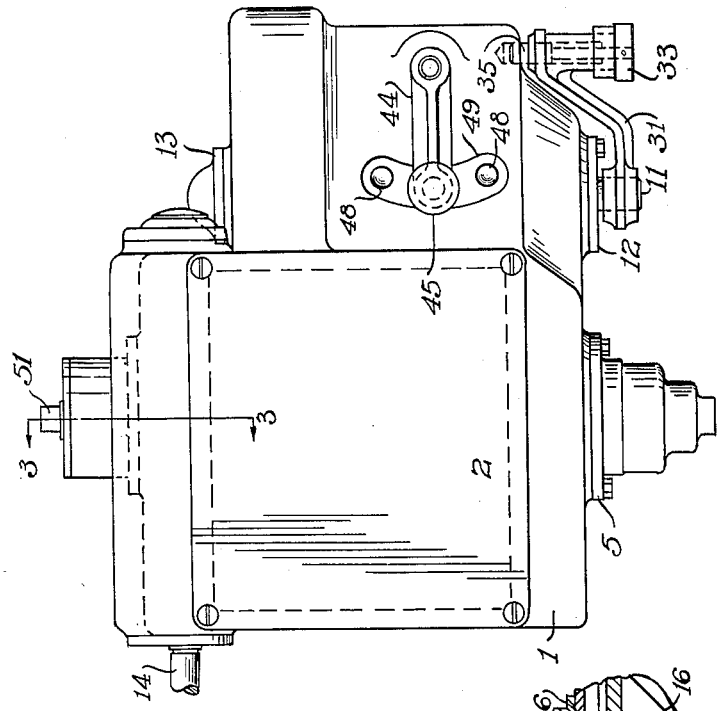
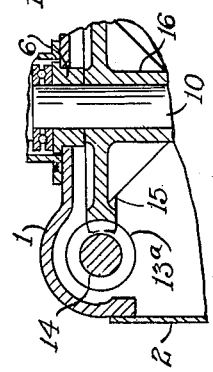
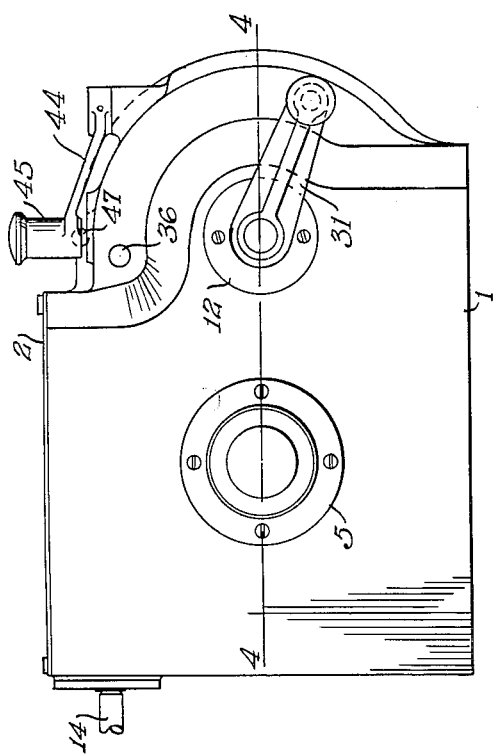
INVENTOR
Walter J. Haag,
BY Howard S. Smith,
His ATTORNEY May 23, 1933. W. J. HAAG 1,911,022
CHANGE SPEED MECHANISM
Filed April 25, 1932 2 Sheets-Sheet 2
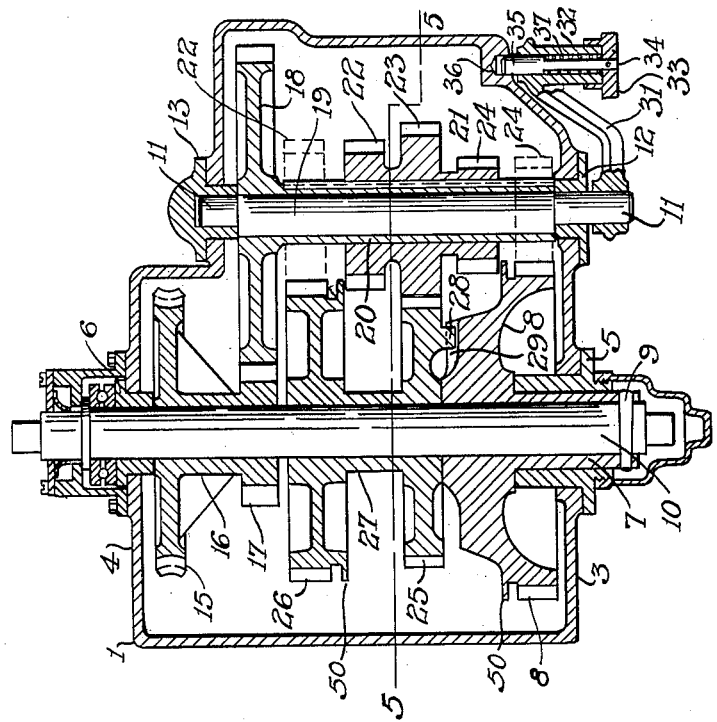
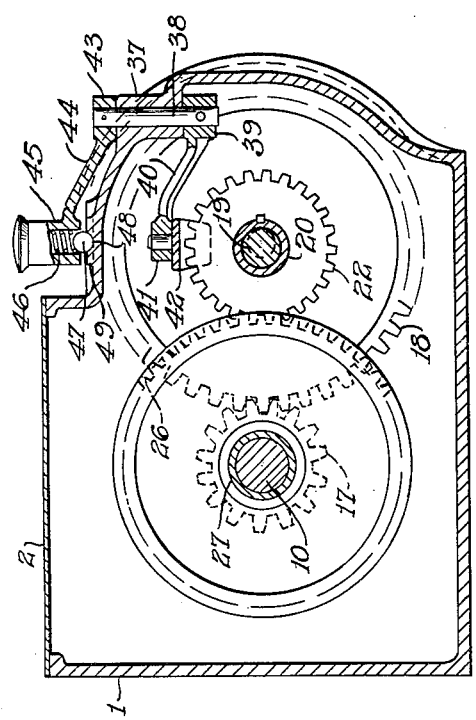
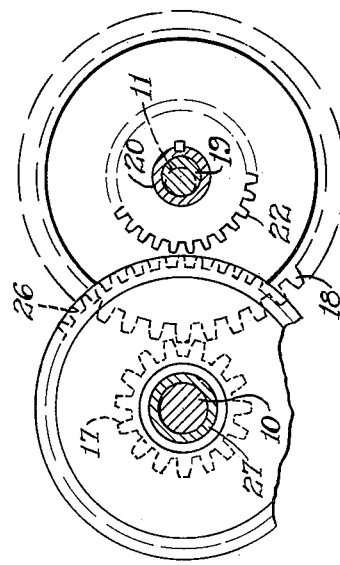
INVENTOR,
Walter J. Haag
BY Howard P. Smith.
His ATTORNEY Patented May 23, 1933

1,911,022

UNITED STATES PATENT OFFICE

WALTER J. HAAG, OF OAKWOOD, OHIO, ASSIGNOR TO THE BROWNELL COMPANY, A CORPORATION OF OHIO

CHANGE SPEED MECHANISM

Application filed April 25, 1932. Serial No. 607,330.

This invention relates to new and useful improvements in change-speed mechanism.

It is one of the principal objects of my invention to provide a change-speed mechanism in which the gear that drives, and moves radially with, the sliding gear cluster, because it is in the same assembly, is formed with long teeth so that it will always be in mesh with the worm, gear or pinion which drives it irrespective of the position of the sliding gears. Thus, when the sliding gear cluster is thrown out by the eccentric, the driven gear on the same shaft will remain in mesh with its driving gear so as not to break the driving connection between the latter and the cluster.

It is another object of my invention to provide one or more of the gears of the sliding cluster with a safety flange to insure that not more than one set of change-speed gears are in mesh at the same time. It also serves to position a selected gear of the change speed cluster for proper mesh with the gear it is to drive when the eccentric is thrown in.

Other important and incidental objects will be brought out in the following specification and particularly set forth in the subjoined claims.

In the accompanying drawings, Figure 1 is a top plan view of the gear box containing my change-speed mechanism. Figure 2 is an end elevational view thereof. Figure 3 is a sectional view taken on the line 3—3 of Figure 1, showing the worm drive. Figure 4 is a longitudinal, sectional view taken through my change-speed mechanism on the line 4—4 of Figure 2. Figure 5 is a cross-sectional view taken through the same on the line 5—5 of Figure 4. And Figure 6 is a diagrammatic view of the position of the long tooth gear when the sliding gear cluster is thrown out by the eccentric.

In the accompanying drawings illustrating my invention, the numeral 1 designates a gear box to receive a speed transmission mechanism through a removable cover plate.

Formed in the end walls 3 and 4 of the enlarged part of the gear box 1 are oppositely disposed axial holes to receive bearings 5 and 6. (See Figure 4.) Rotatable within the bearing 5 is the elongated hub 7 of a gear 8, that is attached by a pin 9 to one end of a shaft 10 whose opposite end is received by the bearing 6. An eccentric shaft 11 is journaled in alinement with the shaft 10, in bearings 12 and 13 in the end walls 3 and 4 of the gear box.

Journaled in suitable bearings in the gear box 1 is a worm 13ª on a drive shaft 14. (See Figures 1 and 3.) This worm is in mesh with a worm gear 15 loosely mounted on the shaft 10. Formed on the worm gear 15 is an elongated hub 16 having on its outer end an integral pinion 17 which is in continuous mesh with a long tooth gear 18 mounted on the eccentric part 19 of the shaft 11.

The gear 18 is formed with an elongated hub extension 20 which surrounds the eccentric portion 19 of the shaft 11 to receive a sliding gear cluster 21. This cluster, which is keyed for a sliding movement on the hub extension 20, consists in this instance of three change-speed gears 22, 23 and 24 integrally connected at their hub portions and of different sizes.

Loosely mounted upon the middle portion of the shaft 10 are two gears 25 and 26 of different diameters joined together by an integral hub portion 27. Formed on the outer face of the gear 25 is a tongue 28 that is adapted to engage in a slot 29 in the inner face of the gear 8, which is of greater diameter than either one of the gears 25 and 26.

As shown by dotted lines in Figure 4, the gear 22 is adapted to be shifted into engagement with the gear 26, and the gear 24 into engagement with the gear 8; the gear 23 being shown in full lines in engagement with the gear 25.

For the purpose of disengaging the gears of the cluster 21 and shifting the latter to a position wherein a selected gear of that cluster will come into mesh with its companion gear on the shaft 10, the following means are provided.

Firmly attached to the right-hand end of the shaft 11 in Figure 4, beyond the bearing 12, is a crank 31 formed at its outer end with a horizontal tubular grip portion 32. At the outer end of the latter is a pull button 33 attached to a latch pin 34 having a shouldered inner end 35. This end of the latch pin is adapted to be held in a recess 36 within an enlarged portion of the end wall 3 of the gear box, by a spring 37 within the tubular grip portion of the crank.

When the button 33 is pulled outwardly to withdraw the enlarged end 35 of the pin 34 from the recess 36, the crank 31 may be turned to rotate the eccentric shaft 11, either to take the gear cluster 21 out of mesh with the gears 6, 25 and 26, or to engage a selected gear of the cluster 21 with its companion gear on the shaft 10.

After a selected gear of the cluster 21 has been completely disengaged from its companion gear on the shaft 10, the cluster may be shifted by the following means to bring another selected gear of said cluster into a position to be engaged with its companion gear when the crank 31 is turned to cause the eccentric shaft 11 to lower the gear cluster.

At its upper middle portion the gear casing 1 is formed with a protuberant part 37 containing a hole to receive a stub shaft 38. Pinned to the inner end of this shaft, within the gear box, is the inner enlarged end 39 of an arm 40. Pivotally secured to the outer enlarged end 41 of the arm 40, is a U-shaped shifting member 42 which straddles the peripheral portion of the middle gear 23 of the cluster 21 to shift the latter when the stub shaft 38 is turned by the following means.

Pinned to the outer end of the stub shaft 38 is the enlarged inner end 43 of a crank 44. This crank is formed at its outer end with a tubular horizontal grip portion 45 containing a spring 46 that is adapted to force a ball 47 into a selected one of three spherical recesses 48 in an arcuate pad 49 on the top wall of the gear box. When this crank 44 is turned to bring the ball 47 into the central recess in the pad, the gear 23 will be in a position to mesh with the gear 25. When the crank is shifted to bring the ball 47 into either one of the end recesses in the pad, an end gear of the cluster 21 will be in a position to be engaged by the eccentric with its companion gear on the shaft 10.

In order to insure a proper engagement of a selected gear of the cluster 21 with its companion gear, I have provided on the inner peripheral portions of the gears 8 and 26, a safety flange 50. (See Figure 4.) These flanges also serve to prevent the meshing of more than one of the sliding cluster gears with its companion gear at the same time. As will be observed from Figure 4, the gears 22 and 24 will be prevented by the flanges 50, 50 from meshing with the gears 25 and 26 while the gear 23 is in engagement with the gear 25.

When the gear 22, for instance, is in engagement with its companion gear 26, as shown in dotted lines in Figure 4, the gear 23 will be prevented from also engaging the gear 26 by the safety flange 50 on the latter. Similarly, when the gear 24 is in engagement with its companion gear 8, as shown in dotted lines in Figure 4, the gear 23 will be prevented by the flange 50 on the gear 8 from engaging the latter.

Another important advantage of my change gear mechanism is that when the eccentric shaft 11 is turned by the crank 31 to disengage a cluster gear from its companion gear, the gear 18 will remain in mesh with its driving pinion 17. This is due to the fact that the teeth on the gear 18 are long enough to remain in engagement with the teeth of the gear 17 when said gear 18 is moved by the eccentric with the gear cluster 21 to a position wherein no one of the gears of said cluster will be in engagement with its companion gear on the shaft 10. (See Figure 6.)

In operation, power is transmitted through means, not shown, to the driving shaft 14. Through the worm on this shaft the worm gear 15 is rotated to rotate the pinion 17 on its extended hub 16. This pinion in turn drives the long tooth gear 18 on whose extended hub the gear cluster 21 is slidingly keyed. When a selected gear such as the gear 23 of said cluster is in engagement with the gear 25 on the shaft 10, the latter gear, through its tongue and slot connection with the gear 8, will drive the latter. Since the hub 7 of the gear 8 is pinned to the shaft 10, this shaft will be driven at the desired speed to produce the required power that may be taken off of its reduced end 51.

Having described my invention, I claim:

1. In a change-speed mechanism, a driving gear, a radially movable gear in mesh with the driving gear, a sliding gear cluster adapted to be driven by the radially movable gear, change-speed gears with which the gears of said cluster are individually engageable, means for moving the sliding gear cluster and its driving gear radially as a unit, to disengage a selected cluster gear from the change-speed gear with which it is in mesh, means for shifting said cluster laterally, and long teeth on the radially movable gear to maintain it in engagement with said driving gear when the sliding gear cluster is disengaged from the change speed driven gears.

2. In a change-speed mechanism, a shaft, a driving gear loosely mounted on said shaft, change-speed gears of different sizes mounted on said shaft to drive the same, an eccentric shaft, a sliding gear cluster mounted on said eccentric shaft, means for turning said eccentric shaft to move a selected gear of said cluster into and out of engagement with a companion change-speed gear, means for shifting said cluster laterally, a gear on said eccentric shaft for driving the sliding gear cluster, and long teeth on the last-named gear to maintain it in engagement with the driving gear on the first shaft when the sliding gear cluster is moved radially by the eccentric to a position wherein all of its gears are out of engagement with their companion change-speed gears.

3. In a change-speed mechanism, a shaft, a driving gear loosely mounted on said shaft, change-speed gears of different sizes mounted on said shaft to drive the same, an eccentric shaft, a sliding gear cluster mounted on said eccentric shaft, means for turning said eccentric shaft to move a selected gear of said cluster into and out of engagement with a companion change speed gear, means for shifting said cluster laterally, a gear having a hub extension on which the gear cluster is keyed for a sliding movement, said hub extension surrounding the eccentric shaft, and long teeth on the gear cluster driving gear to maintain it in engagement with the driving gear on the first shaft when the sliding gear cluster is moved radially by the eccentric to a position wherein all of its gears are out of engagement with their companion change-speed gears.

4. In a change-speed mechanism, a driving gear, a second gear adapted to mesh with the driving gear, a third gear adapted to be driven by the second gear, a fourth gear, radially shiftable means carrying the second and third gears, a device for moving the gear carrying means radially to engage the third gear with the fourth gear, and long teeth on the second gear to maintain it in mesh with the driving gear when the third gear is disengaged from the fourth gear.

In testimony whereof I have hereunto set my hand this 21st day of April, 1932.

WALTER J. HAAG.